United States Patent [19]
Noro et al.

[11] Patent Number: 5,992,558
[45] Date of Patent: Nov. 30, 1999

[54] ELECTRIC POWER STEERING APPARATUS

[75] Inventors: Yoshiki Noro; Yoshinobu Mukai, both of Wako, Japan

[73] Assignee: Honda Giken Kogyo Kabushiki Kaisha, Tokyo, Japan

[21] Appl. No.: 09/098,186

[22] Filed: Jun. 16, 1998

[30] Foreign Application Priority Data

Jul. 14, 1997 [JP] Japan .................................... 9-188644

[51] Int. Cl.⁶ .................................................... B62D 5/04
[52] U.S. Cl. ............................................ 180/446; 701/41
[58] Field of Search ................................... 180/443, 444, 180/445, 446, 421; 701/41, 42

[56] References Cited

U.S. PATENT DOCUMENTS

| | | | |
|---|---|---|---|
| 4,718,514 | 1/1988 | Hirakushi | 180/446 |
| 5,446,660 | 8/1995 | Miichi et al. | 701/41 |
| 5,717,590 | 2/1998 | Mihalko | 701/41 |

FOREIGN PATENT DOCUMENTS 59-100059  6/1984  Japan .

Primary Examiner—Lanna Mai
Assistant Examiner—Avraham Lerner
Attorney, Agent, or Firm—Merchant & Gould P.C.

[57] ABSTRACT

Control unit has a plurality of steering assist modes to which are allocated different characteristics of a target motor current for an assisting motor. Engine rotation sensor detects a current number of rotations of a vehicle engine. Mode switching unit effects a change between the steering assist modes only when the detected vehicle velocity is below a predetermined reference velocity representative of a substantially stationary condition of the vehicle and simultaneously the detected number of rotations of the engine is below a predetermined value. Thus, a change in steering characteristic is permitted only when the engine rotation sensor indicates that the vehicle is in the substantially stationary condition. This way, even with a malfunctioning velocity sensor, it is always possible to avoid an unwanted deterioration in driver's steering feel that would be caused by the steering characteristic change.

3 Claims, 7 Drawing Sheets

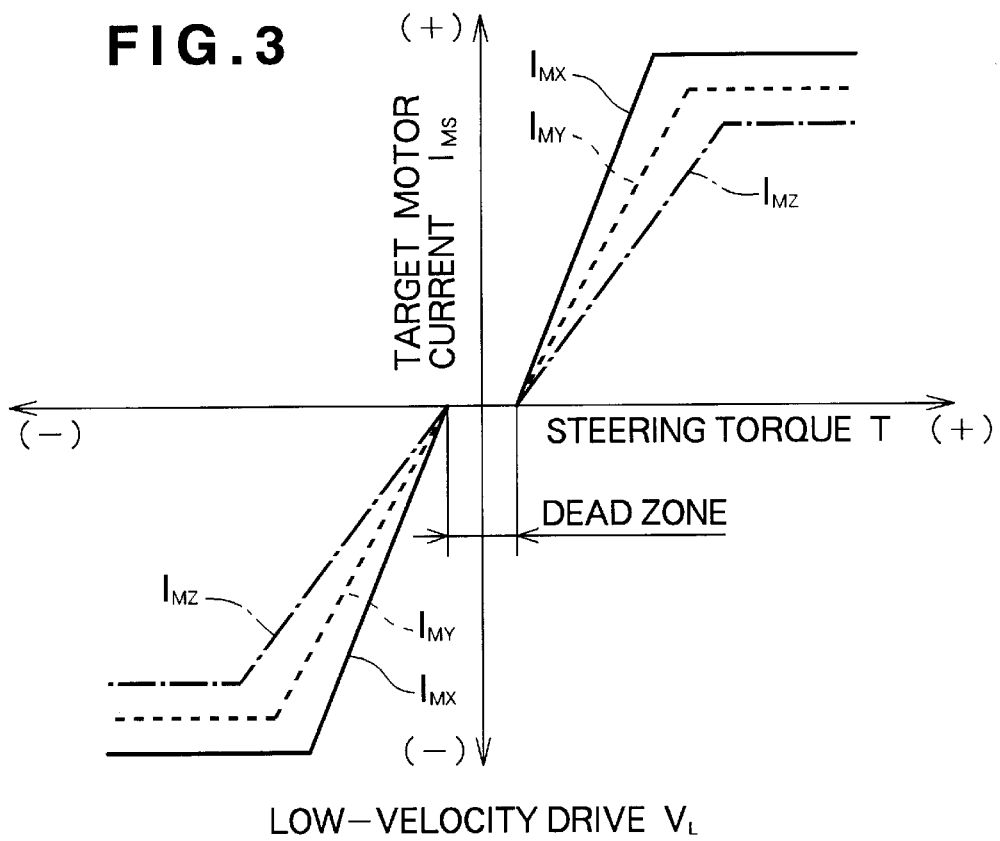
FIG.3 LOW-VELOCITY DRIVE $V_L$
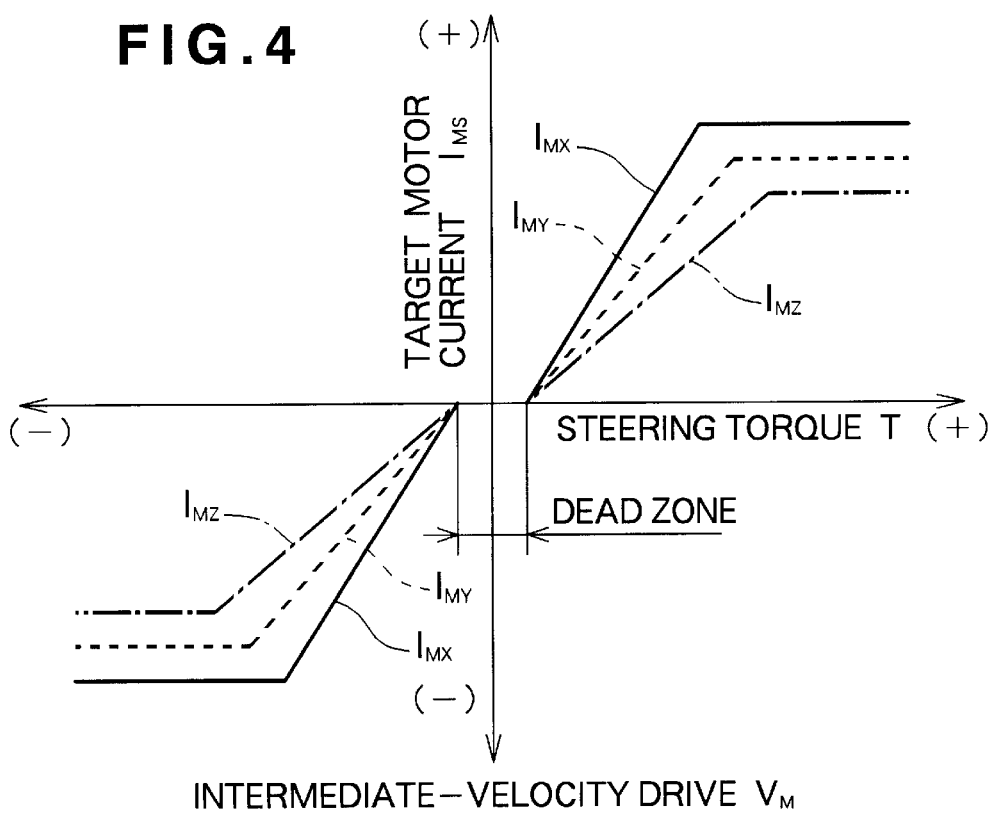
FIG.4 INTERMEDIATE-VELOCITY DRIVE $V_M$

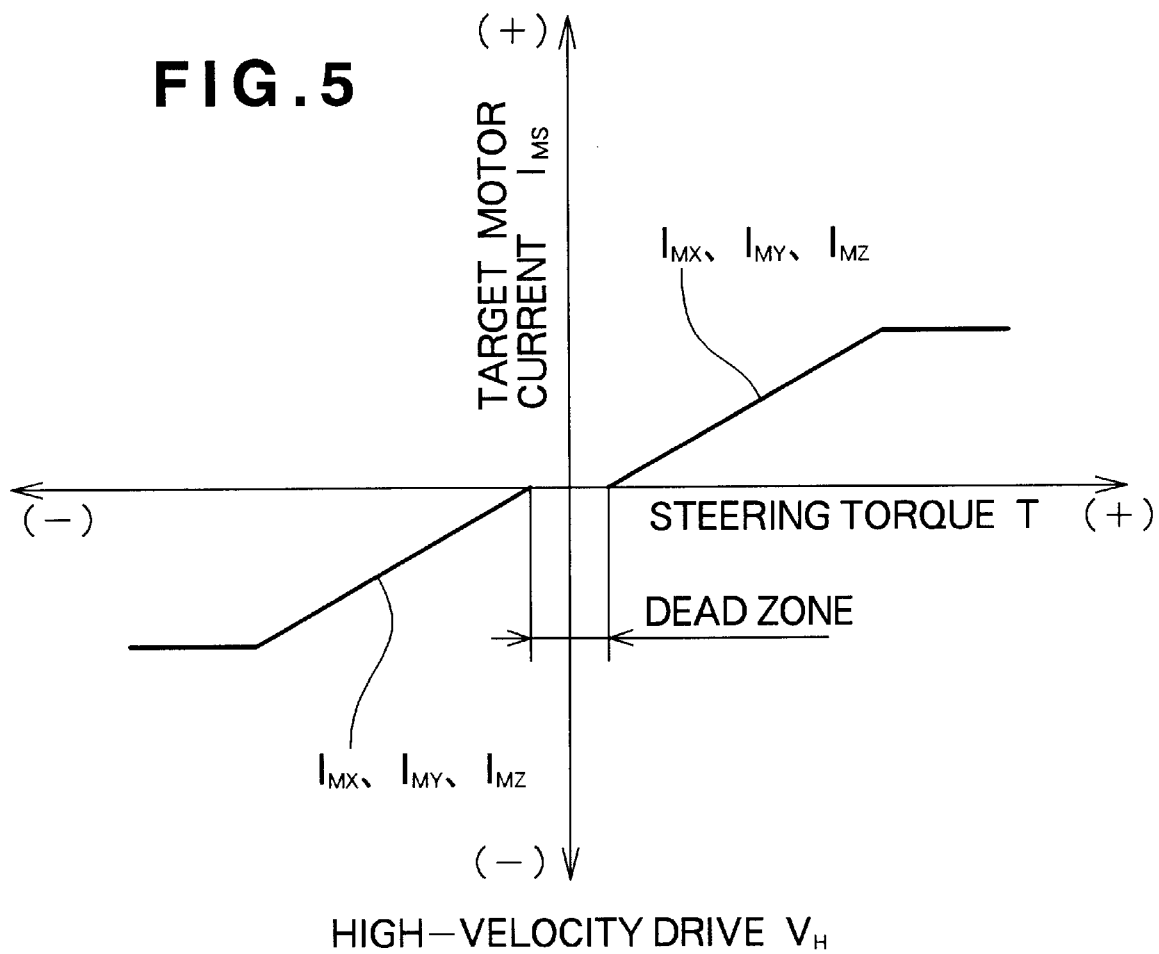

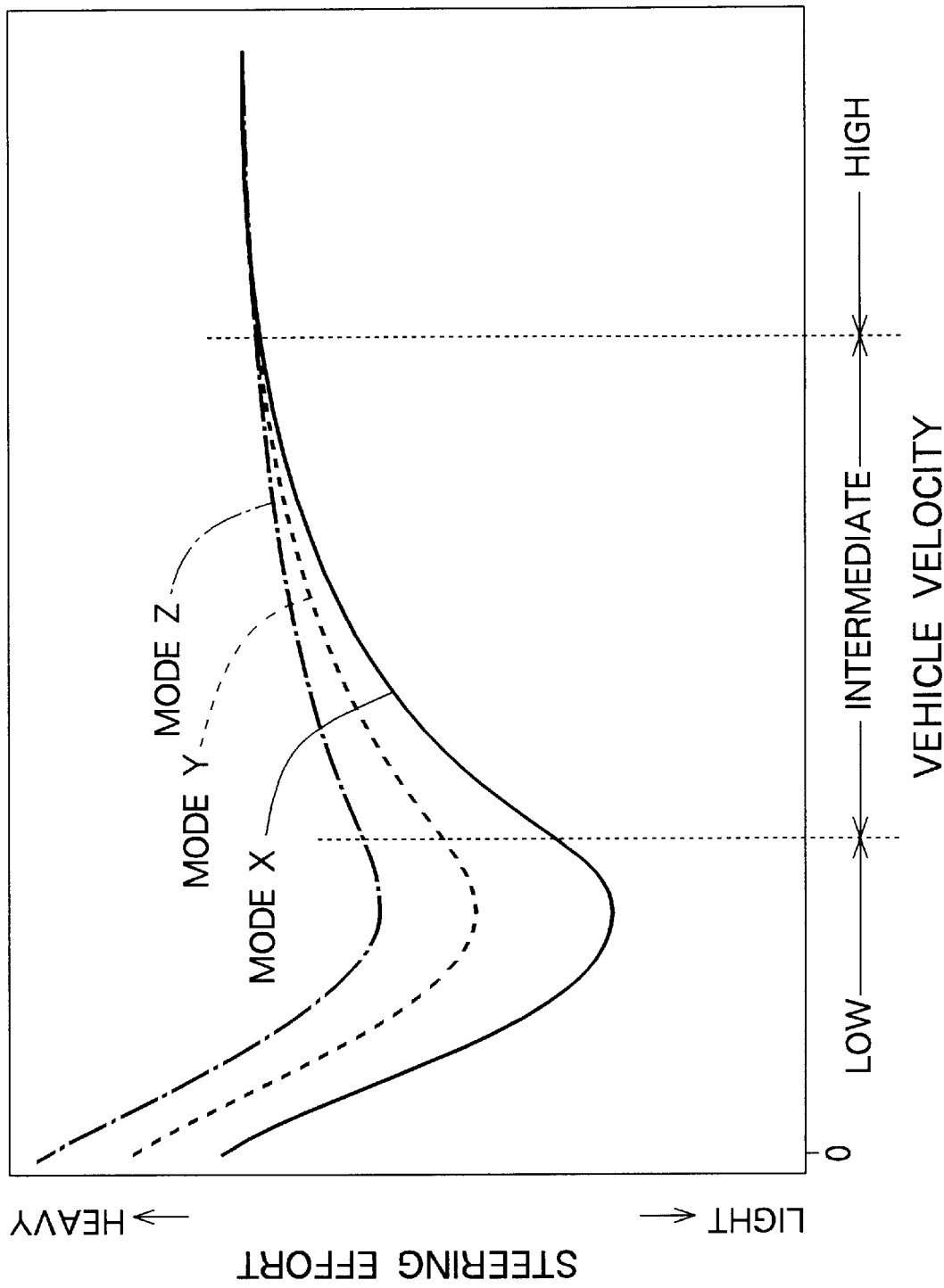

ELECTRIC POWER STEERING APPARATUS

BACKGROUND OF THE INVENTION

1. Field of the Invention

The present invention relates generally to electric power steering apparatuses for automotive vehicles which provide a steering assist of an electric motor directly to the vehicle steering system to reduce steering force to be applied manually by a vehicle driver, and more particularly to an improved electric power steering apparatus which, only when the vehicle is in a substantially stationary condition, permits switching between predetermined characteristics of a plurality of steering assist modes variable as desired by the vehicle driver.

2. Description of the Related Art

In recent years, there has been an increasing demand that an electric steering assist to vehicle driver's manual steering operation be provided with different characteristics depending on the sex, age, driving experience, etc. of the vehicle driver. To address to such a demand, an improved electric power steering apparatus has been proposed in Japanese Patent Laid-open Publication No. SHO-59-100059 which is designed to vary the steering characteristic by switching between normal and sports modes as desired by the vehicle driver. The proposed electric power steering apparatus includes a torque detector for detecting steering torque, a control unit for variably controlling power output from the electric motor in accordance with an output signal from the torque detector, and a servo-rate setting device, positioned within the reach of the vehicle driver operating the automotive vehicle, for setting a desired ratio of the output torque from the motor to a level of input signal to the control. With this electric power steering apparatus, a steering characteristic as desired by the vehicle driver can be obtained by the vehicle driver selecting a servo rate to be set by the servo-rate setting device.

Specifically, the servo rate setting device in the proposed electric power steering apparatus is arranged to vary the relation between the level of input signal to the control and the output torque from the motor and thereby vary the steering characteristic, by setting an amplification factor of an amplifier or an attenuation factor of an attenuator connected between it's torque signal input and the output of the torque detector. The servo rate can be set even during running or travel of the automotive vehicle.

However, in the electric power steering apparatus proposed in Japanese Patent Laid-open Publication No. SHO-59-100059, the output torque from the motor would undesirably vary depending on the servo rate even when the steering wheel is operated with same steering torque, although the steering characteristic can be varied as desired by the vehicle driver even during travel of the automotive vehicle. Because the steering characteristic varies as the servo rate is changed during steering operation, there could occur a sense of "incongruity" in the driver's steering, which would lead to a deterioration in the driver's steering feel. Particularly, variations in the steering characteristic during a high-speed drive of the automotive vehicle would significantly deteriorate the driver's steering feel and also adversely affect the vehicle behavior. Switching between the steering characteristics when the vehicle velocity is sufficiently low (e.g., zero) is most suitable in that it does not adversely affect the vehicle behavior, but the velocity sensor may sometimes malfunction to erroneously detect a zero vehicle velocity although the vehicle is actually running.

SUMMARY OF THE INVENTION

It is therefore an object of the present invention to provide an electric power steering apparatus which, even with a malfunctioning velocity sensor, can always reliably avoid a deterioration in driver's steering feel due to a shift in steering characteristic.

The present invention provides an electric power steering apparatus for an automotive vehicle which comprises: an electric motor for applying an electric steering assist to a steering system of the automotive vehicle; a velocity sensor for detecting a velocity of the automotive vehicle; a steering torque sensor for detecting steering torque manually applied to the steering system; a control unit for setting a target motor current corresponding at least to the steering torque detected by the steering torque sensor, the control unit having a plurality of steering assist modes to which are allocated different characteristics of the target motor current, any one of the steering assist modes being switchably selectable according to a predetermined condition; a drive for driving the electric motor in accordance with a motor control signal generated by the control unit on the basis of the target motor current; an engine rotation sensor for detecting a current number of rotations of a vehicle engine; and a mode switching unit, provided in said control unit, for effecting a change between the steering assist modes when the velocity detected by the velocity sensor is below a predetermined reference velocity representative of an extremely-low-speed or stationary condition (i.e., substantially-stationary condition) of the automotive vehicle and simultaneously the number of rotations of a vehicle engine detected by the engine rotation sensor is below a predetermined value.

By provision of the mode switching unit for effecting an assist mode change when the detected velocity is below the predetermined reference velocity and simultaneously the detected number of rotations of the vehicle engine is below the predetermined value, the electric power steering apparatus of the present invention can reliably inhibit an assist mode change, and hence an unwanted shift in steering characteristic, in such a situation where the velocity sensor is malfunctioning to erroneously detect a zero vehicle velocity although the vehicle is actually running.

In a preferred implementation, the electric power steering apparatus further comprises a mode setting device for generating a mode setting signal, and the mode switching unit includes: a vehicle-velocity determining section for determining that the velocity detected by the velocity sensor is below the predetermined reference velocity; a number-of-engine-rotation determining section for determining that the detected number of rotations of the engine is below the predetermined value; a switching-condition determining section for determining whether a predetermined mode switching condition is met or not on the basis of output signals from the vehicle-velocity determining section and the number-of-engine-rotation determining section; and a switching control section for performing control to permit or inhibit passage of the mode setting signal on the basis of an output signal from the switching-condition determining section. With this arrangement, the electric power steering apparatus enables an assist mode change only when the detected vehicle velocity is sufficiently low, i.e., below the predetermined reference velocity representative of a substantially-stationary condition of the automotive vehicle and simultaneously the detected number of the engine rotations is below the predetermined value.

BRIEF DESCRIPTION OF THE DRAWINGS

The above and other objects and advantages of the present invention will become apparent from the following detailed description of the preferred embodiments when read in conjunction with the accompanying drawings, in which:

FIG. 3 is a graph showing exemplary control characteristic curves, of a target motor current versus detected steering torque for a low-velocity drive, employed in an assist mode control section of the apparatus;

FIG. 4 is a graph showing exemplary control characteristic curves, of the target motor current versus the detected steering torque for an intermediate-velocity drive, employed in the assist mode control section;

FIG. 5 is a graph showing exemplary control characteristic curves, of the target motor current versus the detected steering torque for a high-velocity drive, employed in the assist mode control section;

FIG. 8 is a graph showing relationships between vehicle velocity and necessary manual steering effort in three steering assist modes of the electric power steering apparatus.

DETAILED DESCRIPTION OF THE PREFERRED EMBODIMENTS

Figure 1:
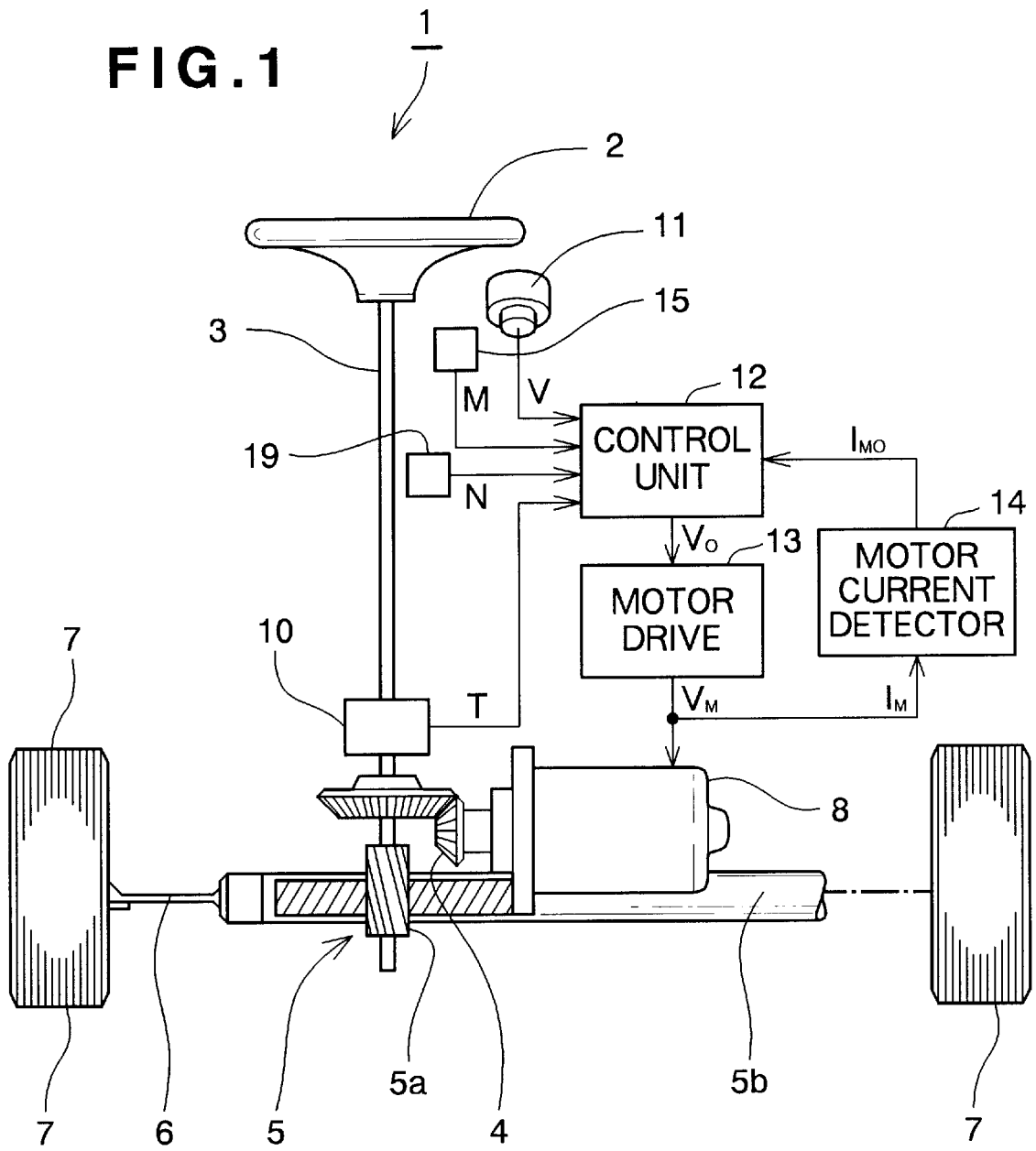
FIG. 1 is a diagram showing the overall setup of an electric power steering apparatus according to a preferred embodiment of the present invention.

FIG. 1 is a block diagram showing the general structure of the electric power steering apparatus according to one embodiment of the present invention. As shown, the electric power steering apparatus 1 comprises a steering wheel 2, a steering shaft 3, a hypoid gear 4, a rack-and-pinion steering gear 5 including a pinion 5a and a rack shaft 5, left and right steerable front wheels 7 connected to the rack shaft 5b via tie rods 6, and an electric motor 8 for generating an electric steering assist.

Further, the electric power steering apparatus 1 comprises a steering torque sensor 10, a vehicle velocity sensor 11, a control unit 12, a motor drive 13, and a motor current detector 14. The steering torque sensor 10 detects steering torque acting on the steering wheel 2 and outputs a steering torque signal T that is an electric signal corresponding to the detected steering torque. The vehicle velocity sensor 11 detects a velocity of the automotive vehicle and outputs a vehicle velocity signal V that is an electric signal corresponding to the detected vehicle velocity. The control unit 12 sets a target motor current for driving the electric motor 8 on the basis of the steering torque signal T and vehicle velocity signal V and also generates a motor control signal $V_O$ corresponding to the target motor current. The motor drive 13 drives the electric motor 8 with a motor voltage $V_M$ based on the motor control signal $V_O$, using the known PWM (Pulse Width Modulation) control scheme. The motor current detector 14 detects a motor current $I_M$ corresponding to forward or reverse rotation of the electrical motor 8 and converts the motor current $I_M$ into a detected motor current signal $I_{MO}$.

The electric power steering apparatus 1 further includes a mode setting device 15 which is disposed, for example, near the driver's seat and issues a mode setting signal M for purposes to be described below, and an engine rotation sensor 19 which outputs a number-of-engine-rotation signal N that is an electric signal corresponding to a detected number of rotations of the vehicle engine. Only when the number-of-engine-rotation signal N from the sensor 19 and the vehicle velocity signal V are simultaneously below predetermined values, the steering apparatus 1 switches between a plurality of steering assist modes to which are allocated different characteristics (e.g., level values) of the target motor current, in response to the mode setting signal M from the mode setting device 15. Normally, the condition where the number-of-engine-rotation signal N from the sensor 19 and the vehicle velocity signal V simultaneously below predetermined values is met when the vehicle is stationary or running at a very low speed. Even when switching between the steering characteristics or assist modes is effected in such a condition to thereby cause a sudden change in assist torque acting on the vehicle steering system, there would occur virtually no adverse effect on the vehicle behavior. This switchable selection of one of the steering assist modes may be made depending on a current operating position of a shift lever where the automotive vehicle in question is of the automatic transmission type, or in accordance with an operating condition of the automatic transmission. In another alternative, the switchable selection of one of the steering assist modes may be made automatically depending on a friction coefficient $\mu$ between the road surface and the vehicle tires.

As the vehicle driver manually operates the steering wheel 2, the torque sensor 10 mounted on the steering shaft 3 detects steering torque to feed a steering torque signal T to the control unit 12. The steering torque manually applied by the vehicle driver to the steering shaft 3 is converted, via the rack-and-pinion steering gear 5, into an axial linear movement of the rack shaft 5b, which changes the steering direction of the front wheels 7 by way of the tie rods 6.

Figure 2:
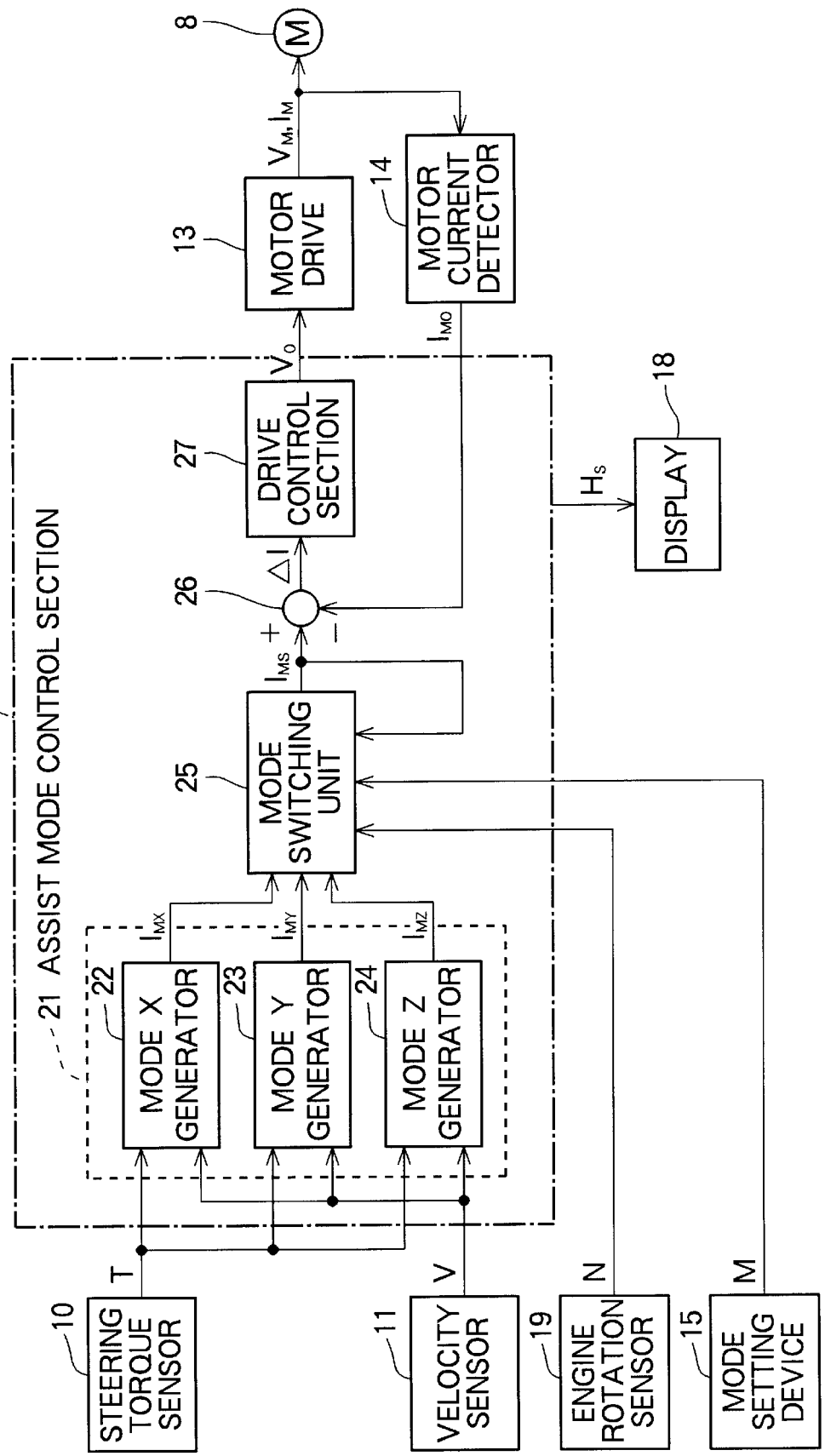
FIG. 2 is a block diagram showing principal parts of the electric power steering apparatus of FIG. 1.

FIG. 2 is a block diagram showing principal parts of the electric power steering apparatus of FIG. 1. The control unit 12, basically comprising a microprocessor, an arithmetic operation section, a processing section and a memory, includes an assist mode control section 21 having a plurality of assist mode generators 22 to 24 to which are allocated different characteristics (e.g., level values) of the target motor current corresponding at least to steering torque signal T. In response to a mode setting signal M given from the mode setting device 15, the control unit 12 selects a particular one of the assist mode generators 22 to 24 to which is allocated the target motor current characteristic corresponding to the signal M. Then, the control unit 12 generates a motor control signal $V_O$ corresponding to a target motor current signal from the selected assist mode generator, in accordance with which the motor drive 13 drives the motor 8 with a motor voltage $V_M$. The selected assist mode generator is visually and audibly displayed to the vehicle driver by means of a predetermined display such as denoted at 18.

The control unit 12 further includes a mode switching unit 25, which permits switching between the steering assist modes by selecting one of the assist mode generators 22 to 24, in accordance with the mode setting signal M given from the mode setting device 15, only when the vehicle velocity signal V from the velocity sensor 11 is below a predetermined, sufficiently small reference velocity value representative of an extremely-low-speed or stationary condition (hereinafter, "substantially-stationary condition") of the vehicle and simultaneously the number-of-engine-rotation signal N from the rotation sensor 19 is below a predetermined value.

The motor drive 13 includes a plurality of (e.g., four) switching elements such as power FETs (Field Effect Transistors) and generates a motor voltage $V_M$ corresponding to the motor control signal $V_O$ (PWM signal) so that the motor 8 is driven by a bidirectional motor current $I_M$ corresponding to the absolute value and direction of the steering torque signal T.

Torque generated by the electric motor 8 is increased twofold via the hypoid gear 4 and applied to the steering shaft 3 as an electric steering assist. The motor current detector 14 converts the motor current $I_M$, to be actually passed to the motor 8, into voltage by means of resistance and/or Hall effect device, and the converted voltage is then again converted into a digital detected motor current signal $I_{MO}$ The digital detected motor current signal $I_{MO}$ is sent to the control unit 12 for negative feedback to the target motor current.

As further shown in FIG. 2, the control unit 12 includes the assist mode control section 21, which is based on a memory such as a ROM and has a plurality of the assist mode generators, i.e., assist mode X generator 22, assist mode Y generator 23 and assist mode Z generator 24, the mode switching unit 25, an offset calculating section 26 and a drive control section 27. Thus, on the basis of the steering torque signal T and vehicle velocity signal V from the torque and velocity sensors 10 and 11, the assist mode generators 22 to 24 output target motor current signals $I_{MX}$, $I_{MY}$, $I_{MZ}$ (representing different characteristics of the target motor current) to the mode switching unit 25.

More specifically, in the assist mode X generator 22, various level values of target motor current signal $I_{MX}$ corresponding to various possible values of steering torque signal T are empirically obtained and stored in association with values of vehicle velocity signal V as parameters, so that the generator 22 supplies the mode switching unit 25 with one of the values of target motor current signal $I_{MX}$ corresponding to the steering torque signal T and vehicle velocity signal V currently detected by the torque and velocity sensors 10 and 11. Similarly, in each of the assist mode Y generator 23 and assist mode Z generator 24, various values of target motor current signal $I_{MY}$ or $I_{MZ}$ and corresponding to various possible values of steering torque signal T are empirically obtained and stored in association with values of vehicle velocity signal V as parameters, so that the generator 23 or 24 supplies the mode switching unit 25 with one of the values of target motor current signal $I_{MY}$ or $I_{MZ}$ corresponding to the steering torque signal T and vehicle velocity signal V currently detected by the torque and velocity sensors 10 and 11.

Thus, the assist mode X generator 22 provides a target motor current characteristic (level value) suitable for a situation where a great electric steering assist relative to the steering torque signal T is required, namely, suitable for beginner's-class, female or aged vehicle drivers who need a greater electric steering assist in response to manual operation of the steering wheel with small force. The assist mode Y generator 23 provides a target motor current characteristic, corresponding to those obtained by the conventional normal-mode steering operation, which afford a smaller electric steering assist than that given by the assist mode X generator 22 in response to the same manual steering force. Further, the assist mode Z generator 24 provides a target motor current signal characteristic, corresponding to those obtained by the conventional sports-mode steering operation, which afford a yet smaller electric steering assist than that given by the assist mode Y generator 23.

FIG. 3 is a graph showing exemplary control characteristic curves, of the target motor current $I_{MS}$ versus the steering torque T for a low-velocity drive $V_L$ employed in the assist mode control section 21. In a region where the steering torque signal T is in a small-value range at and around "0", there exists a "dead zone" where the target motor current $I_{MS}$ maintains a value "0" irrespective of an increase in the value of the steering torque signal T. As the steering torque signal T increases in value beyond the dead zone, the value of the target motor current $I_{MS}$ increases linearly and then reaches a saturated zone where it remains constant irrespective of the increasing value of the steering torque signal T.

As shown in FIG. 3, in the low-velocity driving condition $V_L$, the assist mode generators 22, 23 and 24 of FIG. 2 generate a target motor current signal $I_{MX}$ (solid line), target motor current signal $I_{MY}$ (broken line) and target motor current signal $I_{MZ}$ (dot-dash line), respectively, in response to the steering torque signal T. These target motor current signals $I_{MX}$, $I_{MY}$ and $I_{MZ}$ are of different values decreasing in the mentioned order; that is, the target motor current signal $I_{MX}$ generated by the assist mode X generator 22 has the greatest value and the target motor current signal $I_{MZ}$ generated by the assist mode Z generator 24 has the smallest value. Thus, when the vehicle velocity signal V from the velocity sensor 11 is below the reference velocity value (at and around zero) and simultaneously the number-of-engine-rotation signal N from the rotation sensor 19 is below the predetermined value (e.g., 800 r.p.m.), the vehicle driver can freely select a desired one of the assist mode generators 22, 23 and 24 and hence set a target motor current signal $I_{MX}$, $I_{MY}$ or $I_{MZ}$ suitable for his or her actual manual steering force, by just operating the mode setting device 15.

FIG. 4 is a graph showing exemplary control characteristic curves, of the target motor current $I_{MS}$ versus the steering torque T for an intermediate-velocity drive $V_M$, employed in the assist mode control section 21. In the intermediate-velocity driving condition $V_M$, target motor current signals $I_{MX}$, $I_{MY}$ and $I_{MZ}$ present trends similar to those presented in the low-velocity driving condition $V_L$ of FIG. 3, but these signals $I_{MX}$, $I_{MY}$ and $I_{MZ}$ increase in value at a slower rate than the counterparts of FIG. 3 and reach saturated values smaller than those of FIG. 3.

By thus setting the target motor current signals $I_{MX}$, $I_{MY}$ and $I_{MZ}$ for the intermediate-velocity drive $V_M$ to be smaller in value than the counterparts for the low-velocity drive $V_L$, the electric steering assist from the motor 8 is controlled to become smaller as the vehicle velocity increases; that is, manual steering force to be applied by the vehicle driver gets greater (i.e., the driver's steering effort becomes heavier) as the automotive vehicle speeds up.

FIG. 5 is a graph showing exemplary control characteristic curves, of the target motor current $I_{MS}$ versus the steering torque T for a high-velocity drive $V_H$, employed in the assist mode control section. As shown, in the high-velocity driving condition $V_M$, the assist mode generators 22, 23 and 24 are set to generate respective target motor current signals $I_{MX}$, $I_{MY}$ and $I_{MZ}$ that are identical to each other in value. In the high-velocity driving condition $V_H$, a large-value target motor current $I_{MS}$ is always unnecessary irrespective of manual steering force applied by the vehicle driver, i.e., irrespective of the skill and preference of the vehicle driver, and it is essential that the target motor current signals $I_{MX}$, $I_{MY}$ and $I_{MZ}$ present little or no variations in their values when there occurs a switch from one steering assist mode to another (assist mode change).

Figure 6:
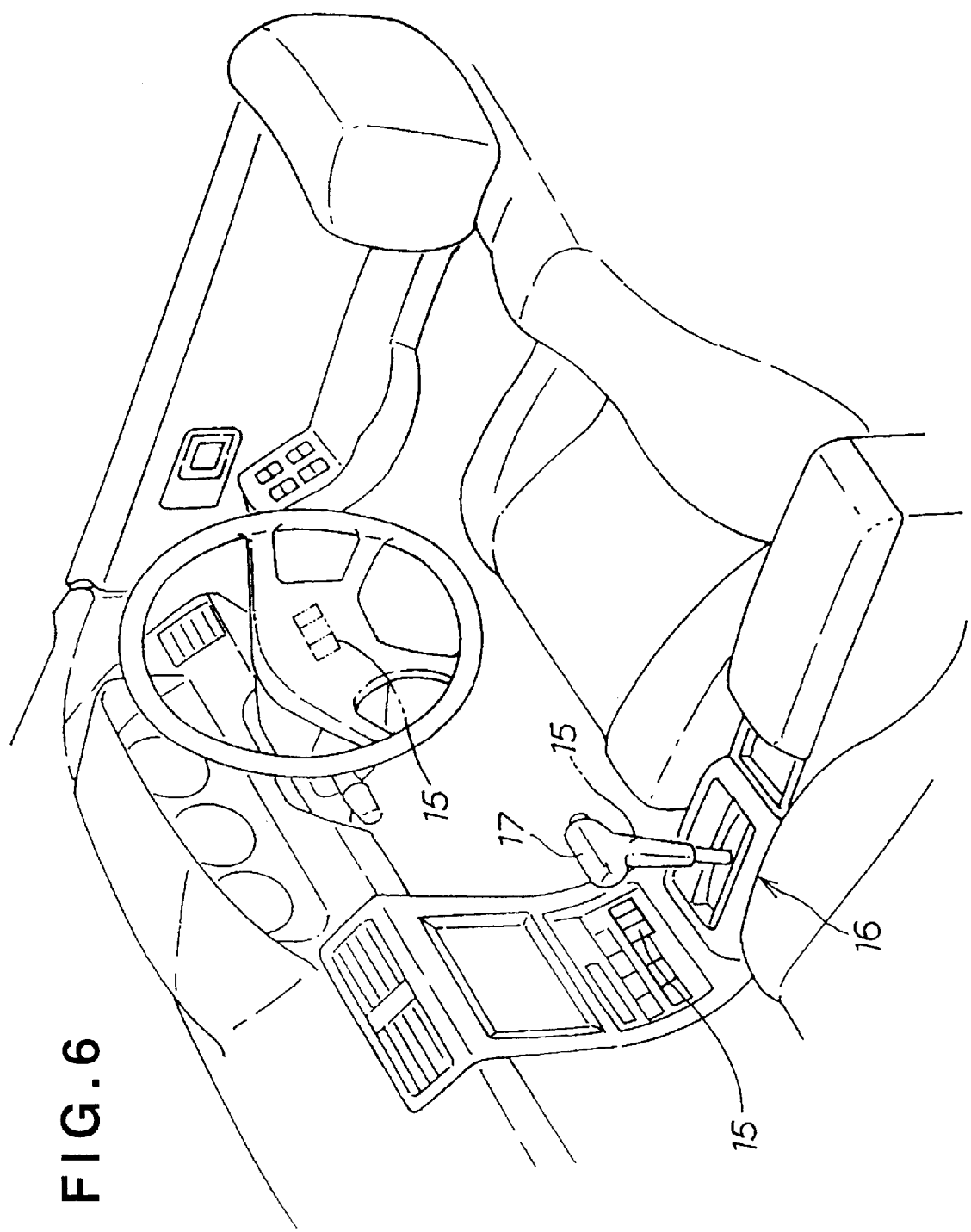
FIG. 6 is a perspective view showing exemplary positions where a mode setting device of FIG. 1 is mounted inside an automotive vehicle near the driver's seat.

FIG. 6 is a perspective view showing an exemplary manner in which the mode setting device 15 is provided inside the automotive vehicle near the driver's seat. In the figure, the setting device 15 is shown as comprising a plurality of push-button switches or keys in corresponding relations to the assist mode generators 22 to 24 of the assist mode control section 21 shown in FIG. 2; these keys may be positioned on the surface of an operation panel or steering wheel or a shift lever of an automatic transmission 16 if the automotive vehicle is of the automatic-transmission type. Thus, the mode setting device 15 supplies the control unit 12 with a mode setting signal M representative of a unique binary code or pulse width corresponding to any one of the keys selectively activated by the vehicle driver.

Figure 7:
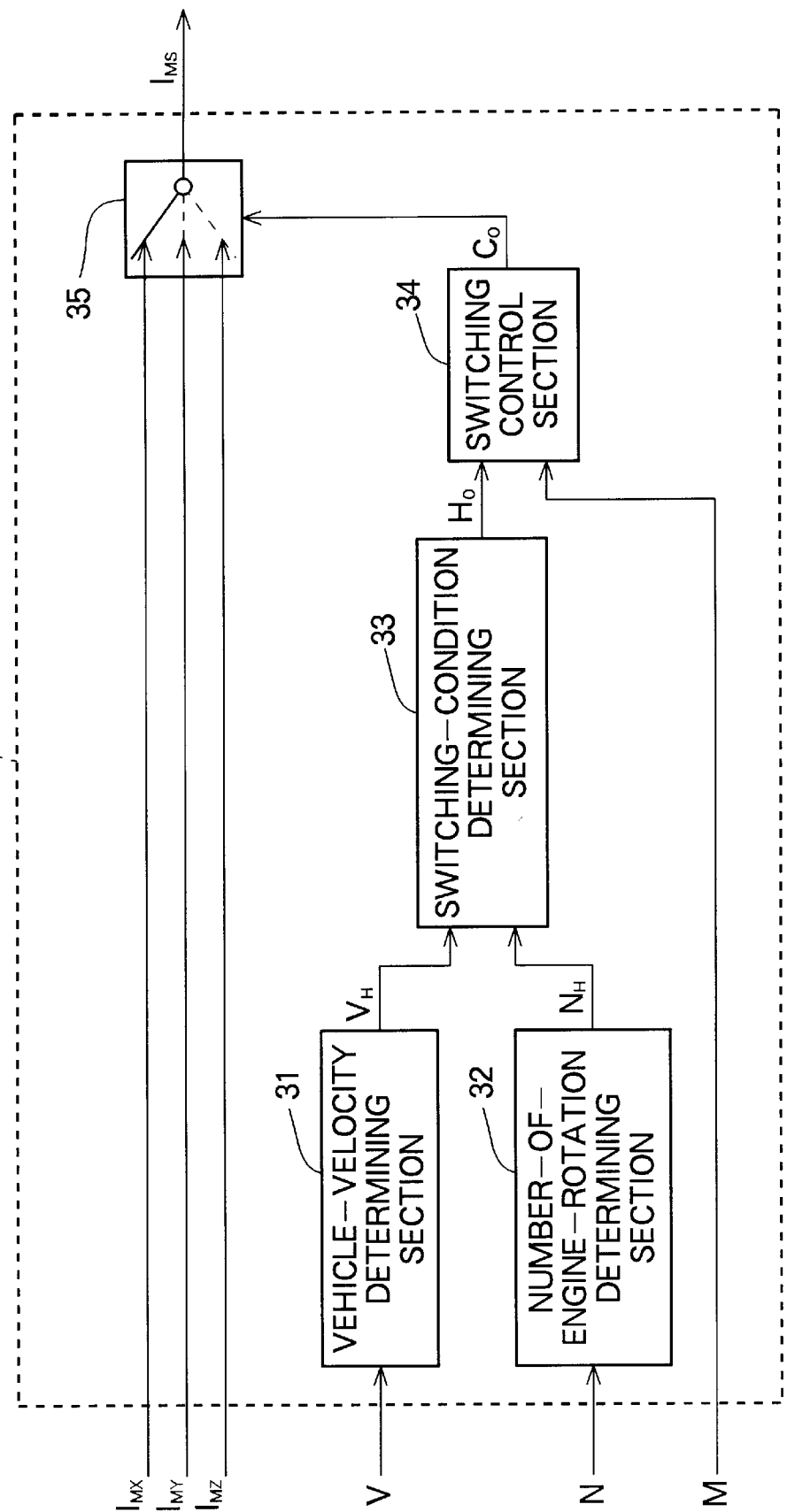
FIG. 7 is a block diagram showing principal parts of a mode switching unit shown in FIG. 2.

FIG. 7 is a block diagram illustrating principal parts of the mode switching unit 25. As shown, the mode switching unit 25 includes a vehicle-velocity determining section 31 for determining that the vehicle velocity V is below the reference velocity value, and a number-of-engine-rotation determining section 32 for determining that the number of the engine rotations is below the predetermined value. Thus, the mode switching unit 25 detects when the vehicle is in the substantially-stationary condition where the vehicle velocity signal V from the velocity sensor 11 is below the predetermined reference velocity value (e.g., 1 Km/h) and simultaneously the number-of-engine-rotation signal N from the rotation sensor 19 is below the predetermined value (e.g., 800 r.p.m.).

The mode switching unit 25 further includes a switching-condition determining section 33 for determining a mode switching condition on the basis of output signals ($V_H$, $N_H$) from the vehicle-velocity determining section 31 and number-of-engine-rotation determining section 32, a switching control section 34 for permitting or inhibiting passage of the mode setting signal M on the basis of an output signal ($H_O$) from the switching-condition determining section 33, and a switch section 35. Thus, the mode switching unit 25 switches between the steering assist modes in response to the mode setting signal M from the mode setting device 15 on the basis of the detection of the vehicle's substantially-stationary condition so that one of the target motor current signals $I_{MX}$, $I_{MY}$ and $I_{MZ}$, from the mode generators 22, 23 and 24, corresponding to the selected mode is used for control of the motor output.

More specifically, the above-mentioned vehicle-velocity determining section 31 has a comparator or soft-ware-controlled comparison function to compare the vehicle velocity signal V from the velocity sensor 11 with a preset reference velocity $V_K$ (e.g., 1 Km/h). Thus, when the vehicle velocity signal V is smaller in value than the reference velocity $V_K$ ($V<V_K$), the vehicle-velocity determining section 31 feeds a vehicle-velocity determination signal $V_H$ (e.g., of high (H) level) to the switching-condition determining section 33.

The number-of-engine-rotation determining section 32 has a comparator or software-controlled comparison function to compare the number-of-engine-rotation signal N from the rotation sensor 19 with a preset reference number of rotation $N_K$ (e.g., 800 r.p.m.). Thus, when the number-of-engine-rotation signal N is smaller in value than the reference number of rotation $N_K$ ($N<N_K$), the number-of-engine-rotation determining section 32 feeds a number-of-engine-rotation determination signal $N_H$ (e.g., of high (H) level) to the switching-condition determining section 33. Note that the reference velocity $V_K$ and reference number of rotation $N_K$ may be made greater than the above-mentioned only within a range where they do not result in a substantial deterioration of the driver's steering feel at the time of an assist mode change. As an example, the reference velocity $V_K$ may be as great as 100 Km/h and the reference number of rotation $N_K$ may be as great as 1,000 r.p.m.

The switching-condition determining section 33 has an AND function, which executes an AND operation between the vehicle-velocity signal $V_H$ (H level) from the vehicle-velocity determining section 31 and the number-of-engine-rotation signal NH (H level) from the number-of-engine-rotation determining section 32 to thereby generate and feed a switching-condition determination signal $H_O$ of H level to the switching control section 34. Thus, from the switching-condition determination signal $H_O$, it is possible to identify the vehicle's stationary condition where the detected vehicle velocity is below the reference velocity value and simultaneously the detected number of the engine rotations is below the predetermined value.

The switching control section 34 has an AND function, which executes an AND operation between the switching-condition determination signal $H_O$ from the switching-condition determining section 33 and the mode setting signal M from the mode setting device 15 to thereby generate and feed a switch control signal $C_O$, representative of a unique binary code or pulse width corresponding to the mode setting signal M from the mode setting device 15 (i.e., currently-set steering assist mode), to the switch section 35. The switch section 35 includes an electronic switch or a software-controlled switch function, which, in response to the switch control signal $C_O$ from the switching control section 34, selects one of the target motor current signals $I_{MX}$, $I_{MY}$, $I_{MZ}$ which represents a steering characteristic corresponding to the driver-set steering assist mode.

With the aforesaid arrangements, the mode switching unit 25 in the control unit 12 allows the vehicle driver to effect an assist mode change only when the vehicle is in the substantially-stationary condition where the vehicle velocity is below the reference velocity value and simultaneously the detected number of the engine rotations is below the predetermined value. Even in a situation where the velocity sensor 11 is malfunctioning to erroneously detect a zero vehicle velocity although the vehicle is actually running, the mode switching unit 25 can reliably inhibit an assist mode change intended by the vehicle driver, on the basis of the determination that the number of the engine rotations is greater than the predetermined value (e.g., 800 r.p.m.). Thus, the vehicle driver is allowed to change the steering characteristic only when the actual vehicle velocity is sufficiently low with the detected number of the engine rotations below the predetermined value.

Referring back to FIG. 2, the offset calculating section 26 has a subtracter or software-controlled subtraction function, which calculates a difference or offset between the target motor current $I_{MS}$ ($I_{MX}$, $I_{MY}$ or $I_{MZ}$) sent via the mode switching unit 25 and the digital detected motor current signal $I_{MO}$ corresponding to the motor current $I_M$ detected by the motor current detector 14 and feeds the thuscalculated offset $\Delta I$ (=$I_{MS}$ −$I_{MO}$) to the drive control section 27.

The drive control section 27 includes a PID controller that applies PID (Proportional and Integral and Derivative) compensation operations to the offset signal $\Delta I$ (=$I_{MS}$ −$I_{MO}$), and a signal generator that generates a motor control signal $V_O$ that is a composite or combination of a PWM (Pulse-Width-Modulated) signal and ON signal to control the direction and intensity of torque generated by the motor 8 on the basis of an output signal from the PID controller.

The motor drive 13 includes a bridge circuit comprised of a plurality of (e.g., four) switching elements such as power FET's (Field-Effect Transistors) and is controlled by the motor control signal $V_O$ containing the PWM (Pulse-Width-Modulated) signal and ON signal, so as to feed motor voltage $V_M$ of a given direction and intensity to the motor 8. Thus, the motor 8 is driven, by the motor voltage $V_M$ fed from the motor drive 13, to generate power or torque corresponding to the motor current $I_M$, and the thus-generated torque is applied to the vehicle steering system as an electric steering assistance.

Further, the motor current detector 14, which may comprise a Hall effect device or resistor for detecting current as voltage, detects the motor current $I_M$ passing through the motor 8 and feeding digital detected motor current $I_{MO}$ back to the negative (−) input of the offset calculating section 26. The motor current detector 14 constitutes a negative feedback loop together with the offset calculating section 26, drive control section 27 and motor drive 13, and control is performed such that the offset signal $\Delta I$ (=$I_{MS}$ −$I_{MO}$) promptly becomes zero ($I_{MS}$=$I_{MO}$) SO that the motor current $I_M$ promptly equals the target motor current $I_{MS}$. The display 18, which may comprise a visual display such as a liquid crystal display or an audio display such as a sound synthesizer, visually or aurally informs the vehicle driver of various states of the currently-selected steering assist mode.

Finally, FIG. 8 is a graph showing relationships between vehicle velocity and manual steering effort in the three steering assist modes of the electric power steering apparatus according to the present invention. As shown, a manual steering force that needs to be applied by the vehicle driver (necessary steering effort) to largely turn the steering wheel during stoppage of the automotive vehicle, i.e., when the vehicle velocity is "0", (hereinafter called "during-stoppage steering effort") is relatively great or heavy in all of the assist modes X, Y and Z; more specifically, the "during-stoppage steering effort" in the assist mode X is set to be lighter than the "during-stoppage steering effort" in the mode Y which is in turn set to be lighter than that in the mode Z.

Although the necessary steering effort differs among the X, Y and Z assist mote, effecting an assist mode change when the vehicle is at or around the zero velocity would not involve significant effects on the vehicle behavior because the vehicle is in the substantially stationary condition.

As the vehicle velocity increases for a low-velocity drive, counteractive force from the road surface decreases and the electric steering assist is governed by the control characteristic of FIG. 3, so that the necessary steering effort in the assist mode X (corresponding to target motor current signal $I_{MX}$) becomes additionally smaller than the necessary steering effort in the mode Y (corresponding to target motor current signal $I_{MY}$) which in turn becomes additionally smaller than that in the mode Z (corresponding to target motor current signal $I_{MZ}$).

Then, in an intermediate-velocity drive, the electric steering assist is governed by the control characteristic of FIG. 4, so that the differences between the necessary steering efforts in the three steering assist modes gradually increase due to an automatically-occurring great braking action responsive to the increasing vehicle velocity, although the magnitudes of the necessary steering efforts remain in the above-mentioned order. Further, in a high-velocity drive, the electric steering assist is governed by the control characteristic of FIG. 5, so that the necessary steering efforts in the three steering assist modes become substantially uniform due to the automatic braking action responsive to the increasing vehicle velocity.

FIG. 8 apparently shows that in the low-velocity and intermediate-velocity driving conditions, the vehicle driver is allowed to selectively set one of the steering assist modes in accordance with his or her inclination or preference and thereby achieve an optimum steering characteristic, because the necessary steering effort is differentiated by selecting one of the assist modes X, Y and Z.

In summary, with the arrangements having been described so far, the electric power steering apparatus of the present invention can reliably inhibit an unwanted assist mode change in such a situation where the velocity sensor is malfunctioning to erroneously detect a zero vehicle velocity although the vehicle is actually running. In addition, the electric power steering apparatus of the present invention allows the vehicle driver to switch to a desired steering assist mode only when the vehicle is in the substantially stationary condition. As a result, the present invention provides an improved electric power steering apparatus which selectively permits a change in steering characteristic only when the engine rotation sensor detects that the vehicle is in the substantially stationary condition and which thus can avoid a deterioration in driver's steering feel due to the change in steering characteristic irrespective of the malfunctioning velocity sensor.

What is claimed is:

1. An electric power steering apparatus for an automotive vehicle comprising:

an electric motor for applying an electric steering assist to a steering system of the automotive vehicle;

a velocity sensor for detecting a velocity of the automotive vehicle;

a steering torque sensor for detecting steering torque manually applied to the steering system;

a control unit for setting a target motor current corresponding at least to the steering torque detected by said steering torque sensor, said control unit having a plurality of steering assist modes to which are allocated different characteristics of the target motor current;

a drive for driving said electric motor in accordance with a motor control signal generated by said control unit on the basis of the target motor current;

an engine rotation sensor for detecting a current number of rotations of a vehicle engine; and a mode switching unit, provided in said control unit, for effecting a change between the steering assist modes when the velocity detected by said velocity sensor is below a predetermined reference velocity representative of a substantially stationary condition of the automotive vehicle and simultaneously the number of rotations of the vehicle engine detected by said engine rotation sensor is below a predetermined value.

2. An electric power steering apparatus as recited in claim 1 which further comprises a mode setting device for generating a mode setting signal, and wherein said mode switching unit includes: a vehicle-velocity determining section for determining that the velocity detected by said velocity sensor is below the predetermined reference velocity; a number-of-engine-rotation determining section for determining that the number of rotations is below the predetermined value; a switching-condition determining section for determining whether a predetermined mode switching condition is met or not on the basis of output signals from said vehicle-velocity determining section and said number-of-engine-rotation determining section; and a switching control section for performing control to permit or inhibit passage of the mode setting signal on the basis of an output signal from said switching-condition determining section.

3. An electric power steering apparatus as recited in claim 2 wherein the mode setting signal generated by said mode setting device corresponds to one of the steering assist modes that is selected by a vehicle driver.

\* \* \* \* \*